(12) United States Patent
Hundsdorfer

(10) Patent No.: US 10,323,681 B2
(45) Date of Patent: Jun. 18, 2019

(54) BOWDEN CABLE CONNECTION FOR A MOTOR VEHICLE LOCK

(71) Applicant: Kiekert AG, Heiligenhaus (DE)

(72) Inventor: Nikolaus Hundsdorfer, Ratingen (DE)

(73) Assignee: Kiekert AG, Heiligenhaus (DE)

( * ) Notice: Subject to any disclaimer, the term of this patent is extended or adjusted under 35 U.S.C. 154(b) by 16 days.

(21) Appl. No.: 15/566,732

(22) PCT Filed: Apr. 15, 2016

(86) PCT No.: PCT/DE2016/100178
§ 371 (c)(1),
(2) Date: Oct. 16, 2017

(87) PCT Pub. No.: WO2016/165695
PCT Pub. Date: Oct. 20, 2016

(65) Prior Publication Data
US 2018/0119724 A1    May 3, 2018

(30) Foreign Application Priority Data

Apr. 16, 2015  (DE) .......................... 10 2015 004 766

(51) Int. Cl.
*F16C 1/00* (2006.01)
*F16C 1/26* (2006.01)
(Continued)

(52) U.S. Cl.
CPC .............. *F16C 1/103* (2013.01); *E05B 79/02* (2013.01); *E05B 79/20* (2013.01); *E05B 85/02* (2013.01); *F16C 1/105* (2013.01); *F16C 2350/52* (2013.01)

(58) Field of Classification Search
CPC .......... F16C 1/103; F16C 1/105; F16C 1/262; E05B 79/20; E05B 79/02
See application file for complete search history.

(56) References Cited

U.S. PATENT DOCUMENTS 4,685,350 A * 8/1987 Bauer .................... F16C 1/105
74/502.4
5,590,567 A   1/1997 Marrs et al.
(Continued)

FOREIGN PATENT DOCUMENTS

DE         3216933 A1 * 11/1983 .............. F16C 1/262
DE         34 41 716 A1   5/1986
(Continued)

OTHER PUBLICATIONS

International Search Report and Written Opinion for corresponding Patent Application No. PCT/DE2016/100178 dated Jul. 29, 2016.
(Continued)

*Primary Examiner* — Luis A Gonzalez
(74) *Attorney, Agent, or Firm* — Renner, Otto, Boisselle & Sklar, LLP

(57) ABSTRACT

The object of the invention is a device (1) for axially fixing one end (9) of a Bowden cable (3), in particular a motor vehicle lock, comprising a housing (2), a Bowden cable (3), wherein the housing (2) has a receptacle (11), in which the end (9) of the Bowden cable (3) can be fixed, wherein the housing (2) has a means for introducing (12) the Bowden cable (3) into the receptacle (11) so that an incorrect assembly of the Bowden cable (3) can be prevented.

13 Claims, 2 Drawing Sheets

Figure 1:
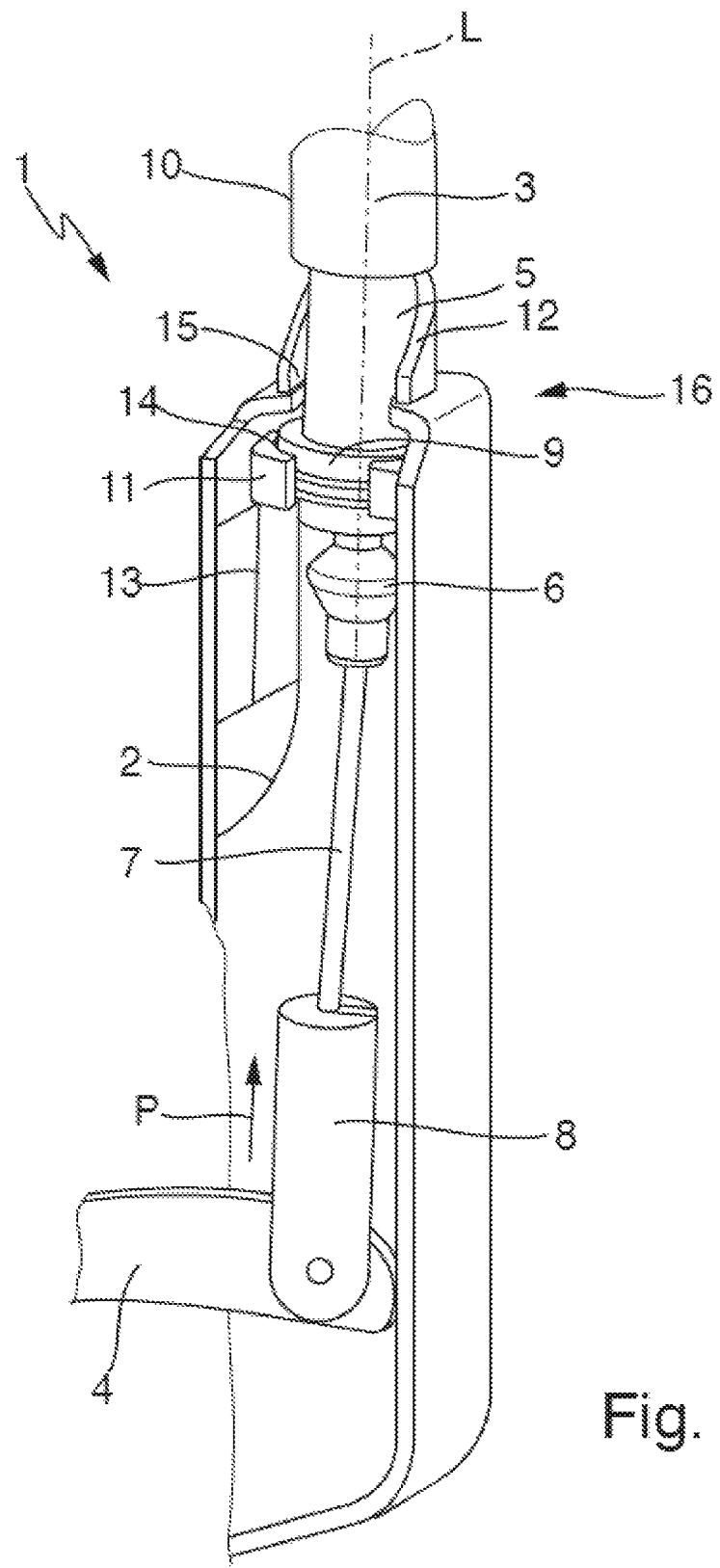

(51) Int. Cl.
*F16C 1/10* (2006.01)
*E05B 79/20* (2014.01)
*E05B 79/02* (2014.01)
*E05B 85/02* (2014.01)

(56) References Cited

U.S. PATENT DOCUMENTS

| | | | | |
|---|---|---|---|---|
| 6,178,845 B1* | 1/2001 | Gutschner | | F16C 1/105 |
| | | | | 74/501.5 R |
| 6,889,574 B2* | 5/2005 | Meyer | | F16C 1/105 |
| | | | | 74/502.4 |
| 8,141,454 B2* | 3/2012 | Ruhlander | | F16C 1/14 |
| | | | | 74/502.6 |
| 9,540,854 B2* | 1/2017 | Graute | | E05B 77/34 |
| 2001/0035066 A1 | 11/2001 | Lacroix | | |
| 2014/0333076 A1* | 11/2014 | Graute | | E05B 77/34 |
| | | | | 292/336.3 |
| 2015/0145262 A1* | 5/2015 | Gotzen | | E05B 77/10 |
| | | | | 292/194 |
| 2016/0208521 A1* | 7/2016 | Weichsel | | E05B 79/20 |

FOREIGN PATENT DOCUMENTS

| | | |
|---|---|---|
| DE | 19810665 | 9/1999 |
| DE | 10107635 | 9/2002 |
| DE | 10 2004 002755 A1 | 8/2005 |
| DE | 102005059833 | 8/2006 |
| DE | 10 2013 203166 A1 | 8/2014 |
| DE | 10 2013 009225 A1 | 12/2014 |
| EP | 0 183 949 A1 | 6/1986 |
| EP | 0 260 900 A2 | 3/1988 |

OTHER PUBLICATIONS

Search Report of DE Application No. 10 2015 004 766.3 dated Nov. 2, 2015.

* cited by examiner

BOWDEN CABLE CONNECTION FOR A MOTOR VEHICLE LOCK

The invention relates to a device for the axial fixing of one end of a Bowden cable, in particular a motor vehicle latch having a housing, a Bowden cable, whereby the housing has a mounting into which the end of the Bowden cable can be fixed.

Bowden cables are generally known and have been used in different technical sectors for many years. A Bowden cable encompasses a flexible wire housed in a plastic cover, whereby the plastic cover usually has a flange at its opposite ends which is accommodated in a bracket, a housing or a mounting device.

Bowden cables are suitable in particular for the transfer of tensile forces, whereby the drive system can be arranged at a distance from the actual triggering mechanism. Advantageously, a force can be exerted over a great distance by means of the Bowden cable, whereby an additional advantage is that the force to be transferred can be deflected. The wire, which is also described as a Bowden cable core, and also the plastic cover surrounding the Bowden cable core are preferably executed flexibly.

Bowden cables preferably have a suitable design at the respective ends of the plastic cover, so that the ends of the plastic cover can be fixed. In addition to the plastic cover surrounding the Bowden cable core, further plastic covers, and also sealants, such as a sealing collar can be arranged on the plastic cover in order to conform to the corresponding requirements.

From DE 10 2013 009 225 A1, a latch for a motor vehicle comprising a Bowden cable and a mounting for the Bowden cable is known. In addition to the ducts for the Bowden cable arranged in the housing of the motor vehicle latch, the motor vehicle latch has a mounting element formed as a separate mounting element, into which one end of the cover of the Bowden cable can be inserted and fixed. The mounting element itself has a centering and mounting fixture and also encompasses chamfered insertion areas to facilitate mounting of the Bowden cable.

Use of a Bowden cable is also known from DE 10 2004 002 755 A1. A motor vehicle latch, into which functional elements such as an internal activation or an external activation are operated by means of a Bowden cable, is revealed. One end of the Bowden cable is accommodated and fixed in a bearing of a housing of the motor vehicle latch, the housing thus fixes the Bowden cable in relation to the motor vehicle latch. The end of the Bowden cable has two circumferential flanges for fixing which can be inserted into grooves of the housing. A secure positioning or fixing of the Bowden cable can thus be guaranteed and a force can be transferred to the functional elements in the motor vehicle latch.

From DE 34 41 716 A1, a holding block is known to accommodate a Bowden cable, whereby the Bowden cable encompasses a flange which is held and can be fixed in a recess of the holding block. The Bowden cable or the flange is inserted into a space in the holding block to mount the Bowden cable in the holding block, whereby a spring tongue needs to be moved flexibly in order to transfer the Bowden cable into its end position. The spring tongue has an entry bevel which, on the one hand, enables easier mounting and, on the other hand, acts as a stop surface to fix the end of the cover in the holding block. The spring tongue can act against an end of the plastic cover. However, it can also in an alternative embodiment act against the flange and enable fixing of the Bowden cable in the direction of the end of the Bowden cable.

A problem which can occur on the known devices for the axial fixing of one end of a Bowden cable is that incorrect mounting of the Bowden cable can occur.

Depending the mounting of the Bowden cable, the flange of the Bowden cable can be inserted into an incorrect groove in the housing, for example, or be mounted against the housing itself. In such a case, the Bowden cable or the Bowden cable core would not be aligned in relation to other functional elements, as constructionally specified, and would, for example, pre-tension the functional element. Pre-tensioning in the area of the functional elements could cause malfunctions in turn.

Furthermore, incorrect mounting of the Bowden cable could lead to the Bowden cable sliding out of its mounting position and thus entering into an undefined state which could lead to damage or cause inoperability.

The task of the invention is to provide an improved device for the axial fixing of one end of a Bowden cable and in particular an improved motor vehicle latch. Furthermore, a task of the invention is to create a possibility which prevents incorrect mounting of the Bowden cable, and also provides a constructionally simple and cost-effective solution.

The task is solved according to the invention by the characteristics of the independent claims. Advantageous designs of the invention are specified in the sub-claims. It is pointed out that the exemplary embodiments described hereafter are not restrictive; instead, any possible variations are possible of the characteristics described in the description and the sub-claims and the Figures. Even if a motor vehicle latch is preferably illustrated in the exemplary embodiment, the invention is not restricted to this use, but is also directed at devices which have a mounting for a Bowden cable and in which incorrect mounting can occur within the scope of mounting.

According to patent claim 1, the task of the invention is solved by a device for axial fixing of one end of a Bowden cable, in particular a motor vehicle latch, being provided, having a housing, a Bowden cable, whereby the housing has a mounting into which the end of the Bowden cable can be fixed and whereby the housing has a means for insertion of the Bowden cable into the mounting, so that incorrect mounting of the Bowden cable can be prevented. The use of a means for insertion of the Bowden cable into the mounting now creates the possibility of preventing incorrect mounting of the Bowden cable. In particular by means of the insertion aid the Bowden cable can only be inserted into the mounting intended for the Bowden cable so that incorrect mounting or a resulting malfunction can be prevented. The insertion means causes the Bowden cable or the end of the Bowden cable inserted into the device to only reach into the mounting provided for the Bowden cable so that a high level of safety can be guaranteed.

Even if a latch for a motor vehicle is stated as a preferred exemplary embodiment, the invention is not restricted to an application in the automotive field, but can also be used in all other types of devices in which a Bowden cable is combined with a housing and whereby the risk exists of a malfunction occurring due to incorrect installation or mounting.

Naturally, a housing can hereby also only act as part of an entire machine and/or a bracket for a Bowden cable mounting. It is crucial for the invention that the housing has a mounting into which the end of the Bowden cable can be fixed or positioned. The Bowden cable preferably has an end of a cover which is braced against the mounting in the housing, so that a pulling and/or pushing movement can be transferred by means of the Bowden cable core. The Bowden cable cover is fixed by the mounting so that the Bowden cable cover is fixed independently of the movement of the Bowden cable core.

The means for insertion of the Bowden cable ensures that the end of the Bowden cable cannot be incorrectly mounted by an installer. The Bowden cable is preferably inserted through an insertion slot, which has at least a width which the Bowden cable core can be threaded through, into the housing or the mounting and placed against the mounting with the Bowden cable cover. By the mounting, the Bowden cable cover thus experiences a thrust bearing so that a shifting of the Bowden cable cover can be prevented on activation of the Bowden cable core. The Bowden cable cover preferably has a flange at its end, i.e. a change in diameter, especially an increase in diameter, which can be inserted at least partly into the mounting in order to guarantee additional accommodation of the Bowden cable.

The insertion means prevents incorrect mounting of the Bowden cable cover in relation to the housing of the device.

If the housing has an opening for the mounting of the Bowden cable and if the insertion means is formed of a shape preventing a form fit between the Bowden cable and the opening, a preferred embodiment of the invention results. If the mounting of the Bowden cable is prevented by a form fit, it is not possible for the installer who preferably mounts the Bowden cable into the housing or the mounting to incorrectly insert the Bowden cable into the mounting. The shape thus prevents the mounting of the Bowden cable in an incorrect position so that incorrect mounting of the Bowden cable is preventable.

Advantageously, a means for preventing incorrect mounting or insertion can easily be produced as a form-fit safety mechanism and can thus be executed cost-effectively. The form fit can prevent the incorrect insertion into the housing on the one hand and also incorrect positioning in the mounting. The means for insertion cannot be inserted or fixed incorrectly due to the shape, i.e. in an incorrect position, whereby on the one hand functioning of the mounted Bowden cable can be guaranteed and malfunctions are also prevented.

In a preferred embodiment of the invention, the insertion means is formed from a housing form prevented from a form fit between the Bowden cable and the opening. The device housing can be made of metal or plastic. In a preferred embodiment the housing is made as an injection-molded component and from plastic. A preferred material is a polyoxymethylene (POM), with or without additional additives. If the insertion means which prevent the form fit on the housing are directly formed on the housing, cost-effective production is also possible using the preferred plastic.

The mold additionally attached to the housing can thus be molded as a separate component or directly as a single component to the housing. It is advantageous that work can take place with standardized Bowden cables, which in turn has a positive effect on costs. The mounting and housing are preferably arranged at a distance from one another at least partially. The insertion means can thus, for example, be molded or attached directly on the housing and the mounting can be formed as a separate component or in turn as a single component with the housing. The insertion means conducts the Bowden cable in such a way that mounting directly on the housing, i.e. at a distance from the mounting, is prevented or completely preventable. The shape of the housing is formed in such a way that fixing of the end of the Bowden cable is prevented in such a way that the Bowden cable cannot be fixed on the housing. Furthermore, the shape formed on the housing can on the one hand prevent incorrect mounting and, at the same time, for example, act as a brace for the Bowden cable or as a duct for the mounted Bowden cable.

If the mounting can, on the one hand, be at a distance from the housing end, i.e. the area in which the Bowden cable is inserted through an opening in the housing, it is thus also conceivable that the Bowden cable is inserted directly into the housing end, i.e. the opening in the housing. This means that the housing end simultaneously forms the mounting for the Bowden cable. The end of the Bowden cable can be directly adjacent on the housing, whereby the insertion means into the mounting can, for example, protrude from the housing and thus prevent incorrect positioning between the mounting and the Bowden cable cover.

In a further preferred embodiment, the insertion means is formed from a Bowden cable design preventing a form fit between the Bowden cable and the opening. In addition to the housing design, a relevant design can also naturally be formed on the flange of the Bowden cable cover which prevents incorrect insertion into the opening or mounting. A flange or two or more flanges can, for example, be formed on the Bowden cable cover which prevents insertion due to its design on the housing and can only be positioned in such a way that the Bowden cable can only be inserted into the position provided for in the device mounting.

If the insertion means is at least partially arranged on the circumference of the opening, a further embodiment of the invention thus results. An opening is preferably provided for on the device housing into which the plastic cover of the Bowden cable can be inserted. Furthermore, the plastic cover of the Bowden cable has an end at a distance from which a flange on the cover can be formed. The Bowden cable cover can be inserted into the opening, whereby the end of the cover and/or the flange can be inserted or fixed into a mounting for fixing and accurate positioning. The mounting properly positions the Bowden cable in order to guarantee a function of the Bowden cable or the connected mechanisms. If the insertion means is now arranged on the opening circumference, incorrect mounting of the Bowden cable cover can thus be prevented in relation to the housing. The arrangement on the opening circumference is advantageous as there is a risk that the end of the cover or the flange can also be inserted against the end of the housing, i.e. the opening area.

If, according to the invention, an insertion means is arranged directly on the circumference opening, the adjacency of the flange or the end of the cover on the housing opening can be prevented. In the simplest case, for example, a pin-shaped, cylinder-shaped and/or cone-shaped elevation can be arranged on the edge or circumference of the opening so that the end of the cover and/or the flange is conducted away from the opening or slides off the elevation. The operator or installer thus experiences haptic and visual notification that the Bowden cable cannot be positioned, whereby incorrect insertion or fixing of the Bowden cable can be prevented.

If the opening in the housing is U-shaped and the execution means is formed from an elevation extending along the circumference, a further embodiment of the invention thus results. A U-shaped opening in the housing offers the advantage that the width of the U-shaped opening can be agreed on the plastic cover of the Bowden cable so that not only insertion of the Bowden cable into the device housing is enabled, but that the opening braces the Bowden cable simultaneously or can stabilize the Bowden cable in position. Advantageously, the opening is executed in such a width that a installer can insert or push the cover into the opening in a play-free manner. The mounting can be arranged at distance from the opening in the device housing. If the insertion means hereby extends along the circumference, an only partial accommodation of the end of the Bowden cable cover or flange on the housing or the opening on the housing can thus also be prevented.

In one embodiment of the invention, the elevation is formed in an ascending manner starting from one end of the U-shaped housing opening and in a descending manner at the opposite end of the U-shaped housing opening, so that the elevation forms a bevel. A bevel, which can be formed attached to the housing opening or as a single component on the housing offers the advantage that the plastic cover of the Bowden cable slides down the bevel so that an installer who wants to mount the Bowden cable on the area on the housing not intended for the opening directly receives a notification which prevents mounting. Instead, the Bowden cable is conducted in such a way that the bevel acts as a mounting aid. In addition to a securing function of the insertion means, the bevel formed on the opening thus acts as a mounting aid which facilitates mounting and conducts the Bowden cable cover or the flange or the end of the cover in a targeted manner in the direction of the mounting so that the installer can mount the Bowden cable more easily, more quickly and in a correct position. The insertion bevel is preferably formed as a single component with the housing and formed as an injection-molded component. The bevel preferably extends directly on the opening circumference so that an additional brace is provided for the Bowden cable cover in one formation of the opening and the bevel extending along the opening.

Furthermore, if a flange is formed on the end of the plastic cover of the Bowden cable, during mounting the flange thus initially comes into contact with the bevel, whereby the bevel conducts the flange in the direction of the insertion slot, i.e. the insertion opening for the Bowden cable cover. The flange is conducted in the direction of the mounting but cannot become adjacent into the mounting in the opening. The bevel is formed in such a way that the Bowden cable cover or the flange is so far from the mounting that it is directly visible to the operator or installer that suspension of the Bowden cable core or an end of the Bowden cable core into a functional unit of the device is not possible, that during suspension of the Bowden cable core, whereby the Bowden cable is tensioned at least partially, slides off the bevel, whereby incorrect mounting is prevented.

In one embodiment, the housing is made of plastic, in particular of polyoxymethylene (POM) and the insertion means is formed as a single component with the housing. The fact that the housing is made of plastic offers the advantage that the housing is light, the opening, the insertion means and the mounting are easy to form and a cost-effective device can also be made. In particular, an elevation in the form of a bevel can easily be molded to the device or the housing. Polyoxymethylene is a common and therefore cost-effective material which also fulfils the requirements of the automotive industry that use in the field of motor vehicle latches is now standard.

The housing is preferably part of a motor vehicle latch and the Bowden cable is connected to an internal activation, an external activation and/or a closure aid for the motor vehicle latch. The Bowden cable core is then connected to an activation lever or a closure aid in the motor vehicle latch.

If the Bowden cable has a Bowden cable cover and if the Bowden cable cover has a flange, whereby the flange can be inserted at least partly into the mounting, a further embodiment of the invention thus results. By means of a flange, i.e. an area of the plastic cover, which has an increased diameter in relation to the cover diameter an increased contact surface can be made in the mounting so that force transmission can be improved between the Bowden cable cover and the mounting. Furthermore, it is advantageous if the flange can be inserted into the mounting at least partially so that not only axial fixing of the Bowden cable cover can be executed, but also radial position securing of the Bowden cable end. The mounting can have a depression which corresponds to the flange diameter so that the flange can be fixed in the mounting in a play-free manner. The Bowden cable cover can thus be axially or radially conducted or fixed in the mounting, whereby the insertion means can stabilize and correctly position the Bowden cable cover beyond the housing end.

If the housing is formed in at least two parts and if the flange can be fixed in the mounting by means of a further housing part, a further embodiment of the invention thus results. If the Bowden cable cover is fixed through the opening, the insertion means and the mounting in the housing, the Bowden cable or the flange formed on the Bowden cable thus requires play in order to be inserted into a depression in the mounting. In this case, a further housing components fixes the Bowden cable in the mounting. But also without a depression in the mounting a closed housing and thus protection for the Bowden cable can be produced by means of a second housing component and additionally radial securing can be produced to position the end of the Bowden cable. The housing is preferably a housing for a motor vehicle latch and the second component is a housing lid for the motor vehicle latch. If the mounting and the second housing component further secure the position of the end of the Bowden cable, the insertion means of the Bowden cable preferably prevents incorrect mounting of the Bowden cable in the housing.

Hereinafter the invention is explained in further detail with reference to the attached drawings on the basis of a preferred exemplary embodiment. However, the principle applies that the exemplary embodiment does not restrict the invention but only constitutes an advantageous embodiment. The characteristics depicted can be executed individually or in combination, individually or in combination with other characteristics of the description, as also the patent claims.

Figure 2:
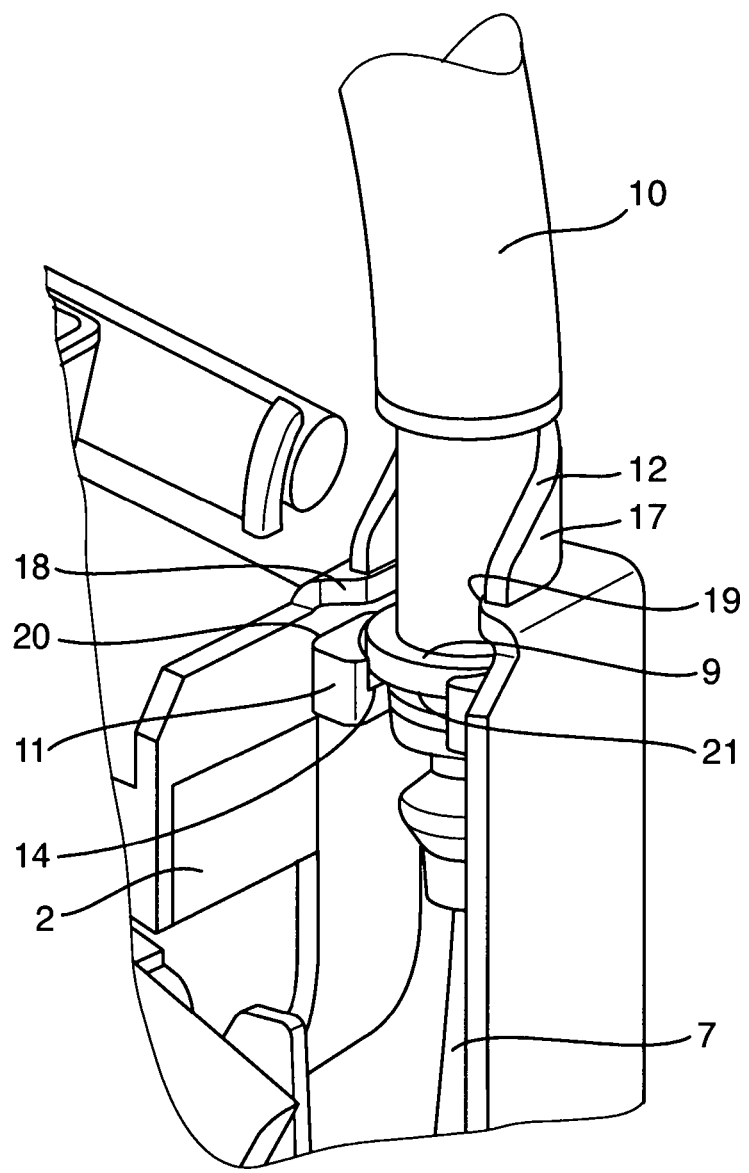

The following are shown:

FIG. 1 a three-dimensional view of a device with an axially fixed end of a Bowden cable in an embodiment in a motor vehicle latch housing, and FIG. 2 a magnified three-dimensional view of the housing with a Bowden cable inserted into a mounting of the housing.

FIG. 1 depicts a device 1 having a housing 2, a Bowden cable 3 and an activation lever 4. The housing 2 is part of a motor vehicle latch housing executed in at least two parts in which an activation lever 4 is pivotably accommodated. The activation lever 4 can be moved in the direction of the arrow P by means of the Bowden cable 3.

The Bowden cable 3 has a Bowden cable cover 5, a Bowden cable seal 6 (seal collar), a Bowden cable core 7 and a connecting element 8 pivotably connected to the activation lever 4. The Bowden cable 5 also has a flange 9 and an additional sheathing 10 for the Bowden cable cover 5. The housing 2 is made of plastic and has a mounting 11 and an insertion means 12, whereby the mounting 11 and the insertion means 12 in this exemplary embodiment are formed as a single component with the housing 2. Further reinforcement ribs 13 can be provided for in the housing 2.

The flange 9 of the Bowden cable cover 5 has a larger diameter than the diameter of the Bowden cable cover 5. In turn, the mounting 11 has a recess 14 into which the flange 9 of the Bowden cable cover 5 is inserted. The recess 14, into which the flange 9 is inserted or pushed radially secures the Bowden cable cover in relation to the housing 2. The insertion means 12 envelops the Bowden cable cover 5 at least in part, whereby the insertion means 12 extends along the opening 15. The insertion means 12 extends along a lengthwise axis L of the Bowden cable 5 and thus additionally braces the Bowden cable cover 5. In one embodiment, the sheathing 10 can additionally be braced on the insertion means 12. i.e. where the flange 9 is inserted completely into the recess 14 of the mounting 11, the additional sheathing 10 is adjacent to the insertion means 12.

In FIG. 2, an enlarged illustration of the connection area 16 of the Bowden cable is also reproduced on the device 1 in a three-dimensional illustration. The same components are equipped with identical reference signs. The recess 14 in the mounting 11 is clearly apparent into which the flange 9 of the Bowden cable cover 5 is pushed in and held in a play-free manner. In the embodiment illustrated in FIG. 2, the insertion means 12 is molded on the housing 2 and forms a bevel 17. The bevel 17 extends from the ends 18, 19 of the opening 15 along the circumference of the opening 15. The bevel 12 envelops the Bowden cable cover 5 at least in a form-fitting manner in part.

During mounting of the Bowden cable 3, the Bowden cable cover is led to the housing 2, whereby an installer can push against the insertion means 12 and in particular against the bevel 12 with the flange 9 of the Bowden cable 3. An insertion of the Bowden cable on the housing and in particular on the insertion means 12 can be prevented by the bevel 17 as the flange 9 slides off the bevel 17 and cannot be fixed. It is only possible for the installer to insert the flange into the mounting 11 when the flange 9 reaches the insertion area 20. The insertion means 12 thus effectively prevents incorrect mounting of the Bowden cable. The Bowden cable 3 can therefore not be fixed incorrectly, whereby safe mounting can be guaranteed. The Bowden cable 3 can only be activated in the adjacency in the mounting 11 so that the activation lever 4 can be activated in the direction of the arrow P by pulling on the Bowden cable core 7, for example.

The illustrated exemplary embodiment can, for example, be a housing 2 for a motor vehicle latch, and the activation lever 4 can, for example, act directly on a locking mechanism in the motor vehicle latch.

The illustrated exemplary embodiment shows the mounting of a Bowden cable 3 in a latch housing in only a part of the latch housing 2. A non-illustrated housing lid has an extension which can be pushed into the insertion area 20, whereby the flange 9 of the Bowden cable cover 5 is secured and fixed in the housing 2.

The flange 9 on the Bowden cable cover 5 has an axial end 21 of the Bowden cable 3 which becomes adjacent in the depression 14 of the mounting 11. The Bowden cable seal 6, such as a sealing collar, for example, can be connected to an extension piece extending through the mounting 11 with the Bowden cable 3. Such Bowden cable seals 6 are known from the state of the art.

The formation of a device according to the invention with an insertion means 12 can enable safe mounting of a Bowden cable 3 and prevent incorrect mounting.

LIST OF REFERENCE SYMBOLS

1 Device
2 Housing
3 Bowden cable
4 Activation lever
5 Bowden cable cover
6 Bowden cable seal, seal collar
7 Bowden cable core
8 Connecting element
9 Flange
10 Sheathing
11 Mounting
12 Insertion means
13 Reinforcement ribs
14 Recess
15 Opening
16 Connection area
17 Bevel
18, 19 End of opening
20 Insertion area
21 End of Bowden cable
P Arrow
L Lengthwise axis

The invention claimed is:

1. A device for axial fixing of an end of a Bowden cable having a mounting flange in a motor vehicle latch, the device comprising:
 a housing extending along a lengthwise axis of the Bowden cable and attached to the motor vehicle latch,
 wherein the housing has a mounting into which the mounting flange of the Bowden cable is radially insertable, whereby the Bowden cable is secured to the housing when the mounting flange is inserted into the mounting,
 wherein the housing has an insertion member extending along the lengthwise axis of the Bowden cable axially adjacent the mounting of the housing, the insertion member receiving a portion of the Bowden cable that is axially adjacent the mounting flange of the Bowden cable in a partly non-form-fitting manner, whereby incorrect mounting of the Bowden cable is prevented,
 wherein the housing has an opening for the mounting of the Bowden cable, and
 wherein the insertion member is arranged at least partly on a circumference of the opening.

2. The device for axial fixing of the end of the Bowden cable according to claim 1, wherein the insertion member includes an elevation arranged on the circumference of the opening, wherein an end of a cover of the Bowden cable or the mounting flange of the Bowden cable slides off the elevation away from the opening to prevent a form fit between the Bowden cable and the opening.

3. The device for axial fixing of the end of the Bowden cable according to claim 2, wherein the opening in the housing is U-shaped.

4. The device for axial fixing of the end of the Bowden cable according to claim 3, wherein the elevation is formed ascending starting from an end of the opening and descending at an opposite end of the opening, so that the elevation forms a bevel.

5. The device for axial fixing of the end of the Bowden cable according to claim 1, wherein the housing is made of plastic.

6. The device for axial fixing of the end of the Bowden cable according to claim 5, wherein the housing is made of polyoxymethylene.

7. The device for axial fixing of the end of the Bowden cable according to claim 1, wherein the portion of the Bowden cable that is axially adjacent the mounting flange of the Bowden cable is a Bowden cable cover.

8. The device for axial fixing of the end of the Bowden cable according to claim 7, wherein a diameter of the flange is larger than a diameter of the Bowden cable cover.

9. The device for axial fixing of the end of the Bowden cable according to claim 7, wherein the insertion member at least partly envelopes the Bowden cable cover.

10. The device for axial fixing of the end of the Bowden cable according to claim 7, wherein the Bowden cable includes a sheathing that is axially adjacent the Bowden cable cover.

11. The device for axial fixing of the end of the Bowden cable according to claim 10, wherein when the flange is inserted into the mounting, the sheathing is adjacent to the insertion member.

12. The device for axial fixing of the end of the Bowden cable according to claim 1, wherein the insertion member is formed as a single piece with the housing.

13. The device for axial fixing of the end of the Bowden cable according to claim 1, wherein the mounting has a depression which is complementary to a diameter of the flange for fixing the flange to the mounting.

\* \* \* \* \*